Patented Feb. 29, 1944

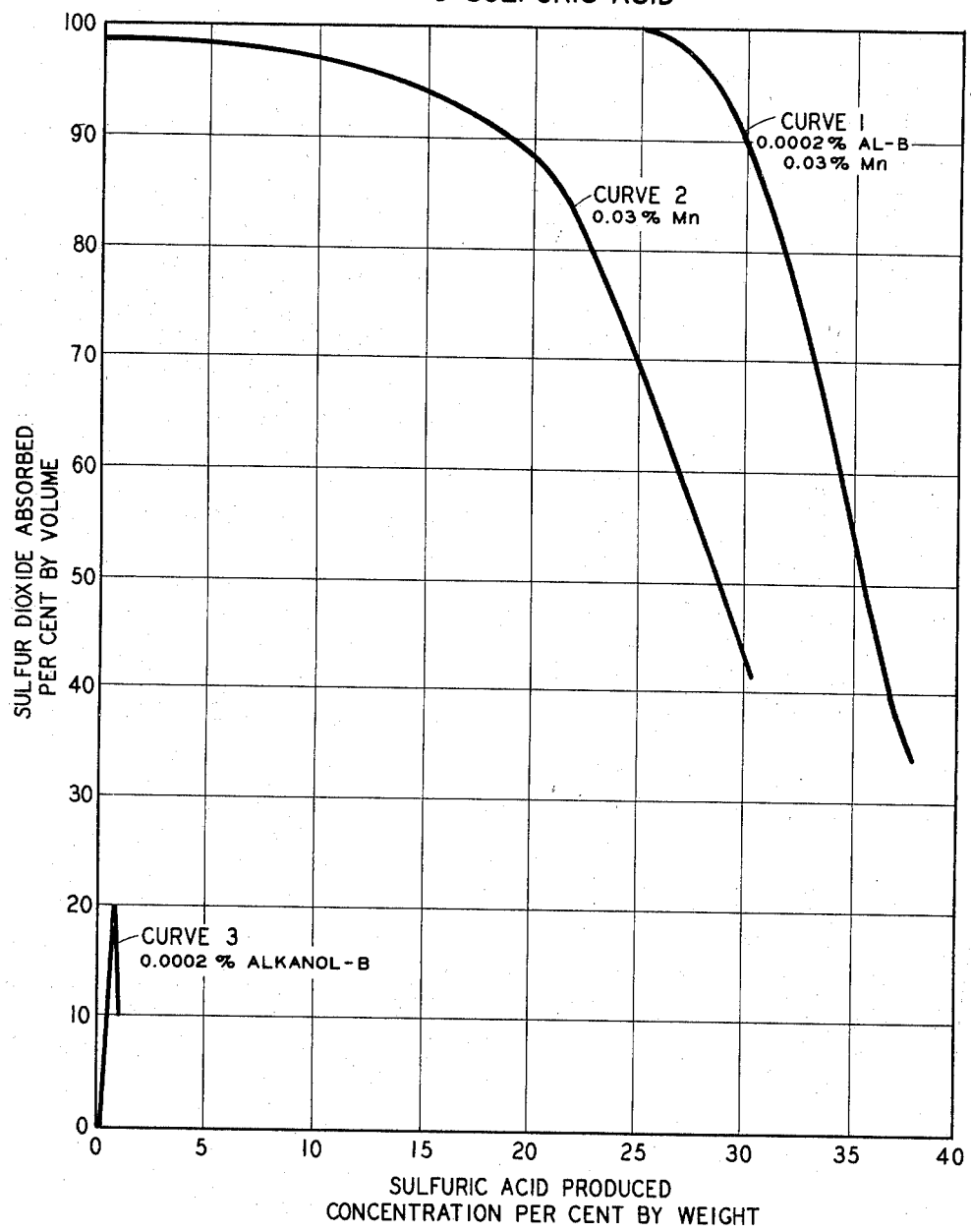

2,342,704

UNITED STATES PATENT OFFICE 2,342,704

MAKING SULPHURIC ACID

Marcus M. Striplin, Jr., Florence, Ala., assignor to Tennessee Valley Authority, a corporation of the United States of America Application February 27, 1943, Serial No. 477,370

3 Claims. (Cl. 23—168)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of recovery of sulphur dioxide from a gaseous mixture containing the same, particularly by converting the sulphur dioxide to sulphuric acid.

One of the objects of this invention is to materially increase the rate of conversion of sulphur dioxide into sulphuric acid. Another object of this invention is to produce a high concentration of sulphuric acid in a short time. Still another object of this invention is to produce relatively high concentrations of sulphuric acid from gaseous mixtures containing relatively low concentrations of sulphur dioxide. A further object of this invention is to provide a process for the recovery of sulphur dioxide by absorbent solutions which may have a surface characteristic which is suitable for efficient absorption, either due to composition of the solution or contamination thereof by detrimental impurities. Other objects of this invention include the provision of an improved liquid composition for absorbing sulphur dioxide and for converting the sulphur dioxide so absorbed into sulphuric acid.

It has long been known that the oxidation of sulphur dioxide in water is catalyzed by the presence of various metals. Manganese salts, such as the sulphate or nitrate, have been found to be excellent catalysts for this purpose. Furthermore, it has been generally assumed that the presence of surface active agents in an absorbent solution would materially improve the absorption of the constituent being recovered. In respect to the specific problem of recovery of sulphur dioxide as sulphuric acid by the use of liquid absorbents, it has now been found that surface active agents generally are not effective in increasing the efficiency of absorption and conversion of sulphur dioxide in the production of sulphuric acid because of their poisoning action on the catalyst. Only one group of materials, namely, alkyl naphthalene sulphonic acids and the alkali metal salts thereof, has been found to be effective for this purpose.

The present invention is directed to a process of making an aqueous solution of sulphuric acid from sulphur dioxide by passing through a gas absorbing zone a stream of an aqueous absorbent solution containing manganese sulphate and material selected from the group consisting of alkyl naphthalene sulfonic acids and the alkali metal salts thereof, both in relatively small amounts and in the concentration required for the maximum rate of conversion for the concentration of the aqueous solution of sulphuric acid being produced; by passing a stream of gas containing sulphur dioxide and oxygen in intimate contact with and countercurrent to said stream of aqueous absorbent solution in said zone; and by withdrawing from said zone an aqueous solution of sulphuric acid containing up to approximately 40 per cent by weight of $H_2SO_4$.

In the accompanying drawing, which forms a part of the specification, the percent of sulphur dioxide absorption as a function of the strength of the sulphuric acid produced is shown. Curve 1 shows this relationship for an aqueous solution containing 0.03% by weight of manganese in the form of manganese sulphate and 0.0002% by weight of sodium alkyl naphthalene sulphonate identified as "Alkanol B." Curve 2 shows the same relationship for an aqueous solution containing 0.03% by weight of manganese in the form of manganese sulphate. Curve 3 also shows this same relationship for an aqueous absorbing solution containing 0.0002% by weight of said Alkanol B.

One example of the operation of the process of the present invention is given for absorbing sulsulphur dioxide from a gaseous mixture containing 3% by weight of sulphur dioxide at a rate of 8 cubic feet per square foot of plate area in a porous plate absorber in contact with an aqueous absorbent solution containing 0.03% by weight of manganese as manganese sulphate and 0.0001 per cent by weight of the commercial sodium alkyl naphthalene sulphonate, Alakanol B, until the concentration of sulphuric acid reached 36.2% by weight. The absorption efficiency as a function of concentration of sulphuric acid produced is shown in the following table:

| Sulphuric acid | Sulphur dioxide absorbed |
|---|---|
| Per cent by weight | Per cent by volume |
| 5 | 99.7+ |
| 10 | 99.7+ |
| 15 | 99.7+ |
| 20 | 99.7+ |
| 25 | 99.2 |
| 30 | 97.6 |
| 35 | 80.5 |

Another example of the operation of the present invention is given wherein the operation proper was substantially identical to that of the preceding example, except that the liquid absorbent solution contained only 0.03% by weight manganese as manganese sulphate and 0.16% by weight of aluminum as aluminum sulphate. This absorbent solution is known to be effective for high efficiency in the recovery of sulphur dioxide in the formation of sulphuric acid. However, in the operation of the absorption tower a liquid absorbent solution is circulated through the tower by means of a pump. From time to time, the efficiency of the absorption was materially reduced below that usually obtained by an effective absorbent of this character, and it was found that such reduction was due to contamination of the absorbent by very small traces of lubricant from the pump. The addition of sodium alkyl naphthalene sulphonate in the form of Alkanol B in an amount required to produce a concentration of about 0.0002% by weight of Alkanol B was sufficient to restore the efficiency of absorption and conversion of the liquid absorbent.

It is evident that there are numerous factors which will influence conditions for the most satisfactory operation of my invention, the actual limits of which cannot be determined except by a detailed study of each set of raw materials and the finished product involved.

The sulphur dioxide used in my process may be obtained from any suitable source, such as the burning of elemental sulphur, the roasting of sulphur bearing ores or the decomposition of intermediate materials, such as aluminum sulphate obtained from aluminum containing materials and produced in a step or steps involved in the production of elemental aluminum from such materials. Such gaseous mixtures will ordinarily contain from 4 to 20% by volume of sulphur dioxide. However, under some circumstances the concentration of sulphur dioxide in the gaseous mixture may be as low as the order of 1% by volume.

Prior to the absorption of the sulphur dioxide from a gaseous mixture containing the same, oxygen is added to such a mixture so that oxygen is present in the resulting mixture in the ratio of at least 0.5 mol of oxygen for each mol of sulphur dioxide. Ordinarily 2.5 to 3 mols of air per each mol of sulphur dioxide in the gaseous mixture is used for this purpose.

The aqueous absorbing medium used contains manganese in an amount which has been known to be most effective when used alone for the absorption of sulphur dioxide from gaseous mixtures, namely, in the order of 0.5% by weight of manganese supplied as the sulfate, nitrate or other water soluble salt. Aqueous absorbing mediums containing 0.03 and 0.04% and even higher concentrations in per cent by weight of manganese may be suitable for this purpose and are so included. In addition, the absorbent of the present invention contains alkyl naphthalene sulphonic acid or an alkali metal salt thereof. The use of sodium alkyl naphthalene sulphonate, such as, for example, material sold under the trade name of Alkanol B has been found to be particularly effective for this purpose, with the amounts of such material required being generally of the order of 0.0001 to 0.0002% by weight. Even where the alkyl naphthalene sulphonic acid is introduced in an alkali metal salt thereof, it is considered probable that it is the alkyl naphthalene sulphonic acid which is present and produces the beneficial effect in the sulphuric acid solution which is produced. Other constituents may also be present in the liquid absorbent solution, but the alkyl naphthalene sulphonic acid appears to be particularly effective in maintaining the efficiency of absorption and conversion of such solutions, particularly where they may be contaminated in the normal course of operation by materials which reduce the surface activity of the absorbent solution.

The gaseous mixture containing the sulphur dioxide may be brought into intimate contact with the liquid absorbing composition by any suitable means commonly used for contacting liquids and gases. The absorption of the sulphur dioxide and its subsequent conversion to sulphuric acid may be carried out discontinuously with the aqueous solution containing the sulphuric acid produced and withdrawn when the desired concentration is reached. However, the most effective procedure is to carry out the operation continuously with the gaseous mixture passing countercurrent to the flow of the liquid absorbing composition with the rate of flow of the liquid so controlled that the desired concentration of sulphuric acid is contained in the aqueous solution withdrawn.

The concentration of dilute sulphuric acid solution produced may vary over a considerable range, although the upper limits for a variety of concentrations of both gas and absorbing mediums have not been determined. Concentrations up to approximately 40% by weight of $H_2SO_4$ may be obtained with a relatively high percentage of sulphur dioxide absorbed.

It will be seen, therefore, that this invention actually may be carried out by the use of various modifications and changes without departing from its spirit and scope.

I claim:

1. A process of making an aqueous solution of sulphuric acid from sulphur dioxide, which comprises (a) passing through a gas absorbing zone a stream of an aqueous absorbent solution containing manganese sulphate and material selected from the group consisting of alkyl naphthalene sulphonic acids and the alkali metal salts thereof, both in relatively small amounts, (b) passing a stream of gas containing sulphur dioxide and oxygen in intimate contact with and countercurrent to said stream of aqueous absorbent solution in said zone, and (c) withdrawing from said zone an aqueous solution of sulphuric acid containing up to approximately 40% by weight of $H_2SO_4$.

2. A process of making an aqueous solution of sulphuric acid from sulphur dioxide, which comprises (a) Passing through a gas absorbing zone a stream of an aqueous absorbent solution containing manganese sulphate and material selected from the group consisting of the sodium salt of butyl naphthalene sulphonic acid and the sodium salt of isopropyl naphthalene sulphonic acid, both in relatively small amounts, (b) passing a stream of gas containing sulphur dioxide and oxygen in intimate contact with and countercurrent to said stream of aqueous absorbent solution in said zone, and (c) withdrawing from said zone an aqueous solution of sulphuric acid containing up to approximately 40% by weight of $H_2SO_4$.

3. A process of making an aqueous solution of sulphuric acid from sulphur dioxide, which comprises (a) Passing through a gas absorbing zone a stream of an aqueous absorbent solution containing manganese sulphate and material selected from the group consisting of the sodium salt of butyl naphthalene sulphonic acid and the sodium salt of isopropyl naphthalene sulphonic acid containing (1) a concentration of manganage of about 0.5% by weight, and (2) a concentration of sodium alkyl naphthalene sulphonic acid of about 0.0001% by weight, (b) passing a stream of gas containing sulfur dioxide and oxygen in intimate contact with and countercurrent to said stream of aqueous absorbent solution in said zone, and (c) withdrawing from said zone an aqueous solution of sulphuric acid containing up to approximately 40% by weight of $H_2SO_4$.

MARCUS M. STRIPLIN, Jr.

CERTIFICATE OF CORRECTION.

Patent No. 2,342,704.   February 29, 1944.

MARCUS M. STRIPLIN, JR.

It is hereby certified that error appears in the printed specification of the above numbered patent requiring correction as follows: Page 1, second column, line 25, strike out "sul-"; page 2, first column, line 52, for "0.5%" read --0.05%--; line 68, for "in an" read --as an--; and that the said Letters Patent should be read with this correction therein that the same may conform to the record of the case in the Patent Office.

Signed and sealed this 16th day of May, A. D. 1944.

Leslie Frazer (Seal)   Acting Commissioner of Patents.